United States Patent
Shoge et al.

(10) Patent No.: US 8,831,810 B2
(45) Date of Patent: Sep. 9, 2014

(54) BICYCLE DRIVE APPARATUS

(75) Inventors: Akihiko Shoge, Osaka (JP); Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 237 days.

(21) Appl. No.: 13/594,521

(22) Filed: Aug. 24, 2012

(65) Prior Publication Data

US 2013/0054067 A1  Feb. 28, 2013

(30) Foreign Application Priority Data

Aug. 29, 2011  (JP) .................................. 2011-186596

(51) Int. Cl.
*B62M 9/06* (2006.01)
*B62M 25/08* (2006.01)
*B62M 6/45* (2010.01)

(52) U.S. Cl.
CPC *B62M 6/45* (2013.01); *B62M 25/08* (2013.01)
USPC ............................................. 701/22; 701/53

(58) Field of Classification Search
USPC ........... 701/22, 36, 52, 53, 54, 61; 180/206.1, 180/206.2, 206.4, 206.5, 206.7, 218, 220
See application file for complete search history.

(56) References Cited

U.S. PATENT DOCUMENTS

| | | | |
|---|---|---|---|
| 5,261,858 A | 11/1993 | Browning | |
| 6,629,574 B2 * | 10/2003 | Turner | 180/206.4 |
| 7,706,935 B2 * | 4/2010 | Dube et al. | 701/22 |
| 2004/0035233 A1 * | 2/2004 | Takeda | 74/336 R |
| 2004/0206188 A1 * | 10/2004 | Takamoto et al. | 73/781 |
| 2005/0075774 A1 * | 4/2005 | Takamoto et al. | 701/51 |
| 2012/0012412 A1 * | 1/2012 | Moeller et al. | 180/206.2 |

FOREIGN PATENT DOCUMENTS

| | | |
|---|---|---|
| CN | 1373057 A | 10/2002 |
| CN | 1412077 A | 4/2003 |
| CN | 1530284 A | 9/2004 |
| FR | 2918957 A1 | 1/2009 |
| JP | 2004-268854 A | 9/2004 |
| JP | 2007-161219 A | 6/2007 |
| JP | 2009-196570 A | 3/2009 |

* cited by examiner

*Primary Examiner* — Jason Holloway
(74) *Attorney, Agent, or Firm* — Global IP Counselors

(57) ABSTRACT

A bicycle drive apparatus includes a bicycle crankset, a bicycle transmission, a drive assistance electric motor and a microcomputer. The microcomputer includes an output control section, a gear shift feasibility determining section and a gear shift control section. The output control section controls an output of the drive assistance electric motor. The gear shift feasibility determining section determines if an output condition of the bicycle crankset satisfies a gear shift allowable condition. The gear shift control section receives a gear shift request, instructs the output control section to at least one of stop the output of the drive assistance electric motor and decrease the output of the drive assistance electric motor, and instructs the transmission to execute a gear shifting operation upon the gear shift permission determining section determining that the gear shift allowable condition is satisfied.

11 Claims, 6 Drawing Sheets

BICYCLE DRIVE APPARATUS

CROSS-REFERENCE TO RELATED APPLICATIONS

This application claims priority under 35 U.S.C. §119 to Japanese Patent Application No. 2011-186596, filed Aug. 29, 2011. The entire disclosure of Japanese Patent Application No. 2011-186596 is hereby incorporated herein by reference.

BACKGROUND

1. Field of the Invention

The present invention relates to a bicycle control apparatus that controls an electrically assisted bicycle. More specifically, the present invention relates to a bicycle control apparatus that controls a bicycle having a crank, an electric motor for riding assistance and a transmission.

2. Background Information

Recently, electrically assisted bicycles that assist riding by supplementing a person's pedaling force with a motor drive force are becoming popular. Japanese Laid-Open Patent Publication No. 2004-268854 discloses a prescribed control for accomplishing a smooth gear shifting operation of the transmission in an electrically assisted bicycle having a transmission. When a user performs an operation resulting in the issuance of a shift command, this control temporarily stops the supply of assistance power from the drive assistance motor and resumes the supply of the assistance power after a short prescribed amount of time has elapsed. With this control, the transmission can change gears more easily because the gear shifting operation is executed while the supply of the assisting power is stopped.

SUMMARY

Although the control disclosed in Japanese Laid-Open Patent Publication No. 2004-268854 may enable the transmission to change gears somewhat smoother, uneven smoother gear shifting operation is desired in an electrically assisted bicycle.

The object of the present invention is to enable a smooth gear shifting operation with little physical shock in a bicycle configured to provide riding assistance using an electric motor.

In accordance with a first aspect, a bicycle drive apparatus is provided that basically comprises a bicycle crankset, a bicycle transmission, a drive assistance electric motor and a microcomputer. The microcomputer includes an output control section, a gear shift feasibility determining section and a gear shift control section. The output control section controls an output of the drive assistance electric motor. The gear shift feasibility determining section determines if an output condition of the bicycle crankset satisfies a gear shift allowable condition. The gear shift control section receives a gear shift request, instructs the output control section to at least one of stop the output of the drive assistance electric motor and decrease the output of the drive assistance electric motor, and instructs the transmission to execute a gear shifting operation upon the gear shift permission determining section determining that the gear shift allowable condition is satisfied.

The crank output condition is a parameter related to the output of the crank. If the crank output condition does not satisfy the gear shift allowable condition, then the transmission is not instructed to execute a gear shifting operation. If the crank output condition satisfies the gear shift allowable condition, then the transmission is instructed to execute the gear shifting operation. In the latter case, the transmission changes gears smoothly because the output of the drive assistance electric motor is stopped or reduced during the gear shifting operation.

In accordance with a second aspect, the bicycle drive apparatus according to the first aspect is provided such that the gear shift feasibility determining section determines the output condition of the bicycle crankset based on a detected position of the bicycle crankset. Sometimes the transmission will not execute the gear shifting operation smoothly when the crank is positioned approximately midway between a top dead center position and a bottom dead center position where a pedaling force of a person riding the bicycle causes a large force to be exerted on the components of the transmission. However, with this aspect, the transmission can execute the gear shift smoothly because the gear shifting operation is executed when the crank output condition related to the position of the crank satisfies the gear shift allowable condition.

In accordance with a third aspect, the bicycle drive apparatus according to the first aspect is provided such that the gear shift feasibility determining section determines the output condition of the bicycle crankset based on a detected transmission torque of the transmission. Depending on the transmission, a gear shifting operation may not proceed smoothly if the transmission attempts the gear shifting operation when a gear shift torque acting on a component of the transmission is comparatively large. However, with this aspect, the transmission can execute the gear shift smoothly because the gear shifting operation is executed when the crank output condition related to the gear shift torque of the transmission satisfies the gear shift allowable condition.

In accordance with a fourth aspect, the bicycle drive apparatus according to the first aspect is provided such that the gear shift feasibility determining section determines the output condition of the bicycle crankset based on a detected rear wheel torque. Depending on the transmission, a gear shifting operation may not proceed smoothly if the transmission attempts the gear shifting operation when a rear wheel torque acting on an axle of a rear wheel of the bicycle is comparatively large. However, with this aspect, the transmission can execute the gear shift smoothly because the gear shifting operation is executed when the crank output condition related to rear wheel torque satisfies the gear shift allowable condition.

In accordance with a fifth aspect, the bicycle drive apparatus according to the first aspect is provided such that the gear shift feasibility determining section determines the output condition of the bicycle crankset based on a detected torque of a crank axle of the bicycle crankset. Depending on the transmission, a gear shifting operation may not proceed smoothly if the transmission attempts the gear shifting operation when a torque acting on the crank axle is comparatively large. However, with this aspect, the transmission can execute the gear shift smoothly because the gear shifting operation is executed when the crank output condition related to the crank axle torque satisfies the gear shift allowable condition.

In accordance with a sixth aspect, the bicycle drive apparatus according to the second aspect is further comprises a crank position sensor that detects a position of the bicycle crankset. The gear shift feasibility determining section determines that the gear shift allowable condition is satisfied while a crank arm of the bicycle crankset is positioned within twenty degrees of at least one of a top dead center position and a bottom dead center position of the bicycle crankset. When the crank is positioned near the top dead center position or the bottom dead center position, the torque acting on the crank axle due to the pedaling force is small and the transmission can execute a gear shifting operation more smoothly. In view of this fact, in this aspect, the gear shift allowable condition is determined to be satisfied when the crank is positioned near top dead center or bottom dead center.

In accordance with a seventh aspect, the bicycle drive apparatus according to the fifth aspect further comprises a crank axle torque measuring section that measures a torque of the crank axle. Additionally, the gear shift feasibility determining section determines that that the gear shift allowable condition is satisfied while the torque of the crank axle is within a prescribed range. The torque of the crank axle affects the torque acting on the components of the transmission. With this aspect, the gear shift allowable condition is determined to be satisfied and the transmission executes the gear shifting operation when the torque of the crank axle is determined to be within a prescribed range of comparatively small torque values. The gear shifting operation is smooth because the transmission executes the gear shifting operation when the torque of the crank axle is small, i.e., when the tension of a chain of the bicycle is small.

In accordance with an eighth aspect, the bicycle drive apparatus according to any one of the first to seventh aspects is provided such that the transmission includes a gear, shift motor, and the gear shift control section issues a shift command to drive the gear shift motor to shift the transmission. With this aspect, although the gear shifting operation is accomplished by driving the gear, shift motor, the size and the electric power consumption of the gear shift motor can be reduced because the gear shifting operation is smoother.

In accordance with a ninth aspect, the bicycle drive apparatus according to any one of the first to eighth aspects is provided such that the drive assistance electric motor is configured to drive a bicycle chain. With this aspect, the chain, to which a pedaling force of a person is transmitted through the crank, is also driven directly or indirectly by the drive assistance electric motor. Since the bicycle drive apparatus serves to decrease the tension of the chain, the gear shifting operation of the transmission becomes smoother.

In accordance with a tenth aspect, the bicycle drive apparatus according to any one of the first to ninth aspects is provided such that the transmission is an internal transmission. The internal transmission is a transmission that uses gear wheels. Depending on the position where the internal transmission is installed, it may be called a rear wheel hub transmission or a crank axle transmission. With this internal transmission, although gear shifting operations are generally smoother when the transmitted torque is smaller than when the transmitted torque is larger, a smooth gear shifting operation can be accomplished with the bicycle drive apparatus because the torque imposed on the transmission is smaller during the gear shifting operation.

In accordance with an eleventh aspect, the bicycle drive apparatus according to any one of the first to ninth aspects is provided such that the transmission is an external transmission. An external transmission is a transmission in which gear shifting is accomplished by moving the chain between sprockets using a derailleur. A front derailleur that moves the chain between sprockets of the crank axle and/or a rear derailleur that moves the chain between sprockets of the rear wheel are operated with a wire (cable) extending from a shifter or an electric motor in order to change gears. With this external transmission, a gear shifting operation is not adversely affected when some degree of tension exists in the chain, but gear shifting is difficult when an excessive amount of tension exists in the chain. However, with the bicycle drive apparatus, the gear shifting operation is smooth because an excessive tension force is prevented from developing in the chain during the gear shifting operation.

With the bicycle drive apparatus, as described in more detail below, when a request to change gears occurs, the output of the drive assistance electric motor is stopped or decreased and the transmission executes the gear shifting operation when a crank output condition satisfies the gear shift allowable condition. As a result, a smooth gear shifting operation can be accomplished.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
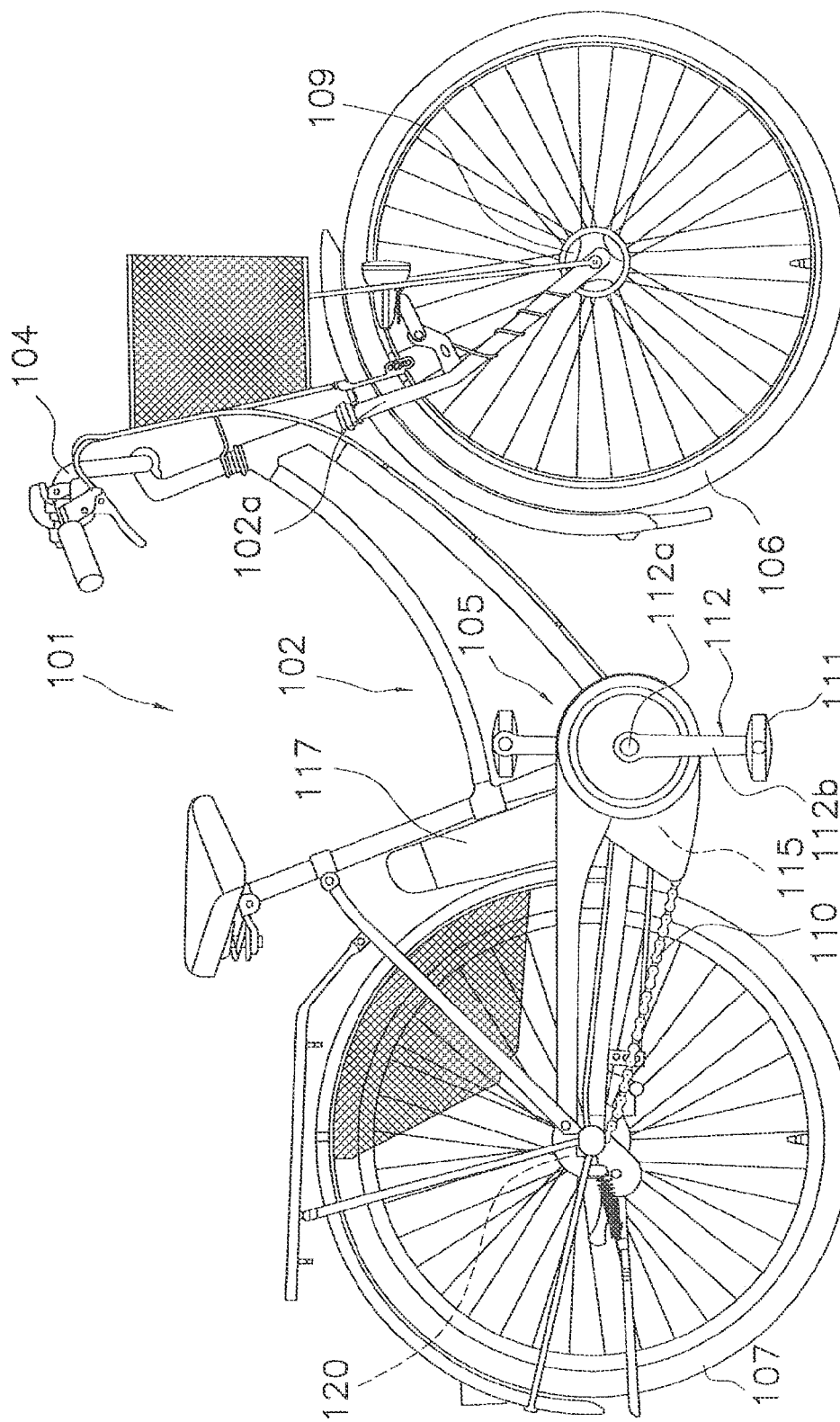
FIG. 1 is a side elevational view of a bicycle in which a bicycle drive apparatus is employed in accordance with a first embodiment.

FIG. 1 shows a bicycle 101 that employs a bicycle control apparatus according to one embodiment. The bicycle 101 mainly comprises a frame 102 having a front fork 102a, a handlebar 104, a drive unit 105, a front wheel 106, and a rear wheel 107.

The drive unit 105 has a chain 110, a crankset 112 onto which pedals 111 are attached, an assist mechanism 115 that includes an assist motor 116 (see FIG. 4) explained later, and a rechargeable battery 117 that is detachable and serves as a power supply for the assist mechanism 115. These components are supported on the frame 102. The rechargeable battery 117 is a storage battery that uses, for example, a nickel chloride cell or a lithium ion cell and is detachably mounted to the frame 102.

The crankset 112 comprises a crank axle 112a and extends in a horizontal direction and a left-right pair of crank arms 112b that are provided on axially opposite ends of the crank axle 112a and arranged 180 degrees out of phase from each other. The pedals 111 are attached to tip end portions of the crank arms 112b. The crank axle 112a is supported rotatably on the frame 102. The chain 110 is arranged on a front sprocket fixed to the crank axle 112 and a rear sprocket provided on an internally geared hub 120 (explained later).

Figure 2:
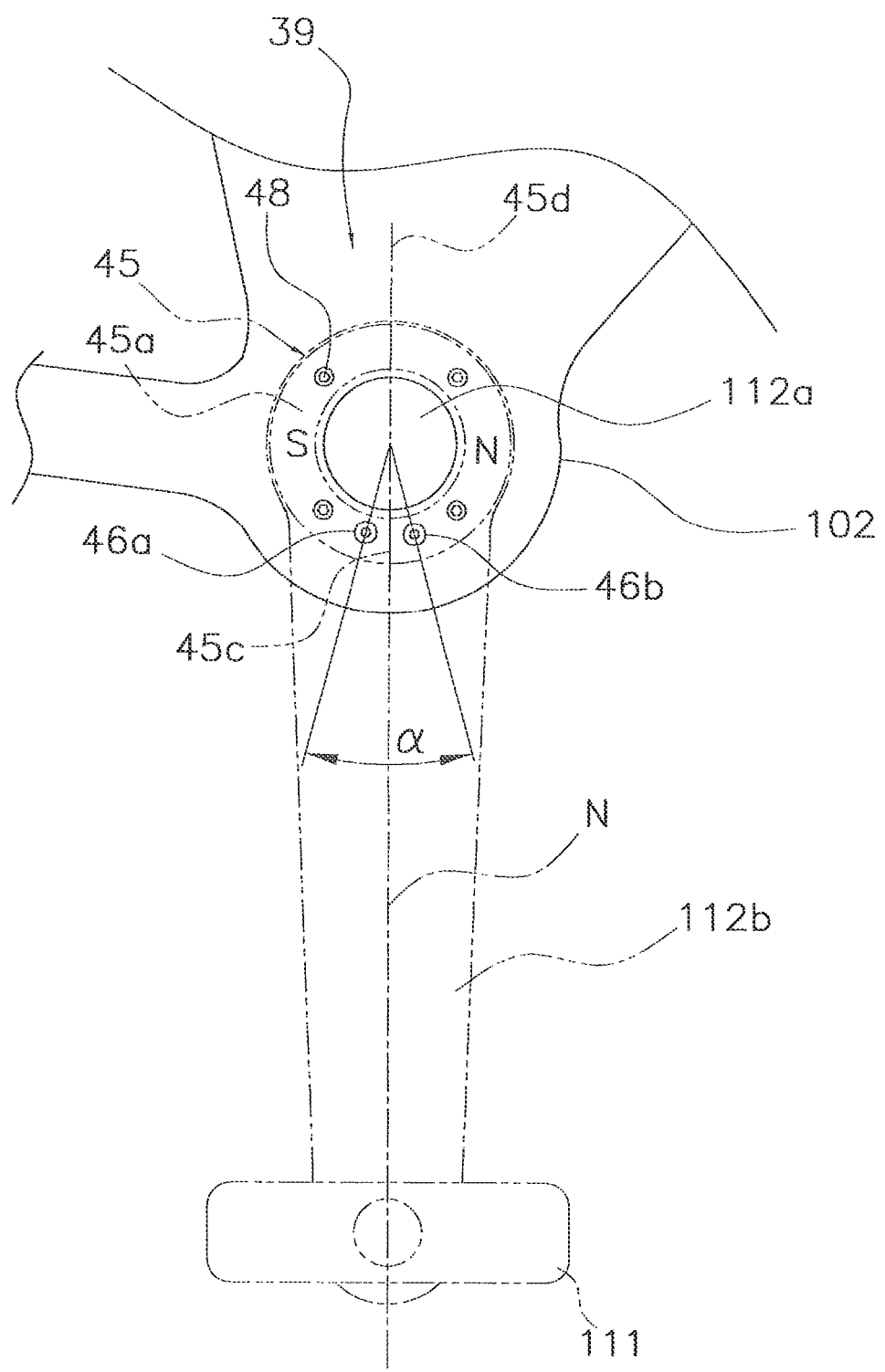
FIG. 2 shows a crank position sensor.

The crank position sensor 39 is installed onto the bicycle 101 as shown in FIG. 2 in order to detect the positions of the crank arms 112b of the crankset 112. The crank position sensor 39 has a magnet 45 provided on one of the crank arms 112b and a first element 46a and a second Hall element 46b provided on the frame 102.

The magnet 45 has an annular shape and has an S pole 45a and an N pole 45b arranged closely adjacent to one another along a circumferential direction. The magnet 45 is fixed to the crank arm 112b with a fastening member 48. The fastening member 48 comprises, for example, a plurality of screws. The S pole 45a and the N pole 45b are arranged around an outer circumference of the crank axle 112 and, in the embodiment, each has a semicircular shape. For example, it is as though the magnet 45 were divided by a plane containing a center of the crank axle 112a and one side constitutes the S pole 45a and the other side constitutes the N pole 45b. Since the S pole 45a and the N pole 45b are closely adjacent, there are two borders. The borders are separated by 180 degrees about the crank axle 112a. A first border line 45c and a second border line 45d corresponding to the borders between the S pole 45a and the N pole 45b are arranged along a lengthwise directions of the crank arms 112b. More preferably, the first border line 45c and the second border line 45d are provided in a plane N (see FIG. 2) that contains a rotational axis of the crank axle 112a and an axial centerline of the mounting holes of the pedals 111. At the first border line 45c, the N pole 45b is arranged on an upstream side in a counterclockwise direction and the S pole 45a is arranged on a downstream side. At the second border line 45d, the S pole 45a is arranged on an upstream side in a counterclockwise direction and the N pole 45b is arranged on a downstream side.

The first Hall element 46a and the second Hall element 46b are attached to the frame 102 in positions facing the magnet 45. The magnet 45 faces the first Hall element 46a and the second Hall element 46b along an axial direction of the crank axle 112a. The first element 46a and the second Hall element 46b are each arranged to correspond to a prescribed range a that includes a bottom dead center of the right crank arm 112b or a bottom dead center of the left crank arm 112b (top dead center of the right crank arm 112). The prescribed range α is a range spanning, for example, 15° from a reference position arranged at the bottom dead center or top dead center position of one of the crank arms 112b in both rotational directions of the crank arm 112b. The prescribed region α corresponds to, for example, a 30 degree rotational angle of the crank arm 112b. The rotational angle of the crank arm 112b corresponding to the prescribed region α is preferably within the range of 20 to 40 degrees.

The assist mechanism 115 uses the drive assistance motor 116 to generate a prescribed supplementary torque corresponding to a torque acting on the crank axle 112a of the crankset 112 due to a pedaling force exerted by a person (e.g., a torque equal to the product of a prescribed value and the torque acting on the crank axle 112a). The torque of the drive assistance motor 116 is transmitted directly or indirectly to the chain 110 through a power assistance sprocket. For example, it is acceptable for the power assistance sprocket to be coupled to the crank axle or to a front sprocket. That is, the drive unit 105 transmits the pedaling force imparted to the crank axle 112a by the person and the output of the drive assistance motor 116 (exemplifying a drive assistance electric motor) to a sprocket of the internally geared hub 120 through the chain 110.

The internally geared hub 120 forms part of an internal transmission and is incorporated into the rear wheel 107. The internally geared hub 120 is, for example, an eight-speed hub arranged at the center of the rear wheel 107. An electric gear shift motor 123 is coupled to the internally geared hub 120 and serves to electrically drive a gear changing mechanism that comprises a planetary gear mechanism. Together the gear shift motor 123 and the internally geared hub 120 constitute an internal transmission. The internally geared hub 120 is coupled to a rear brake device comprising, for example, a roller brake, a band brake, or a disk brake.

Figure 3:
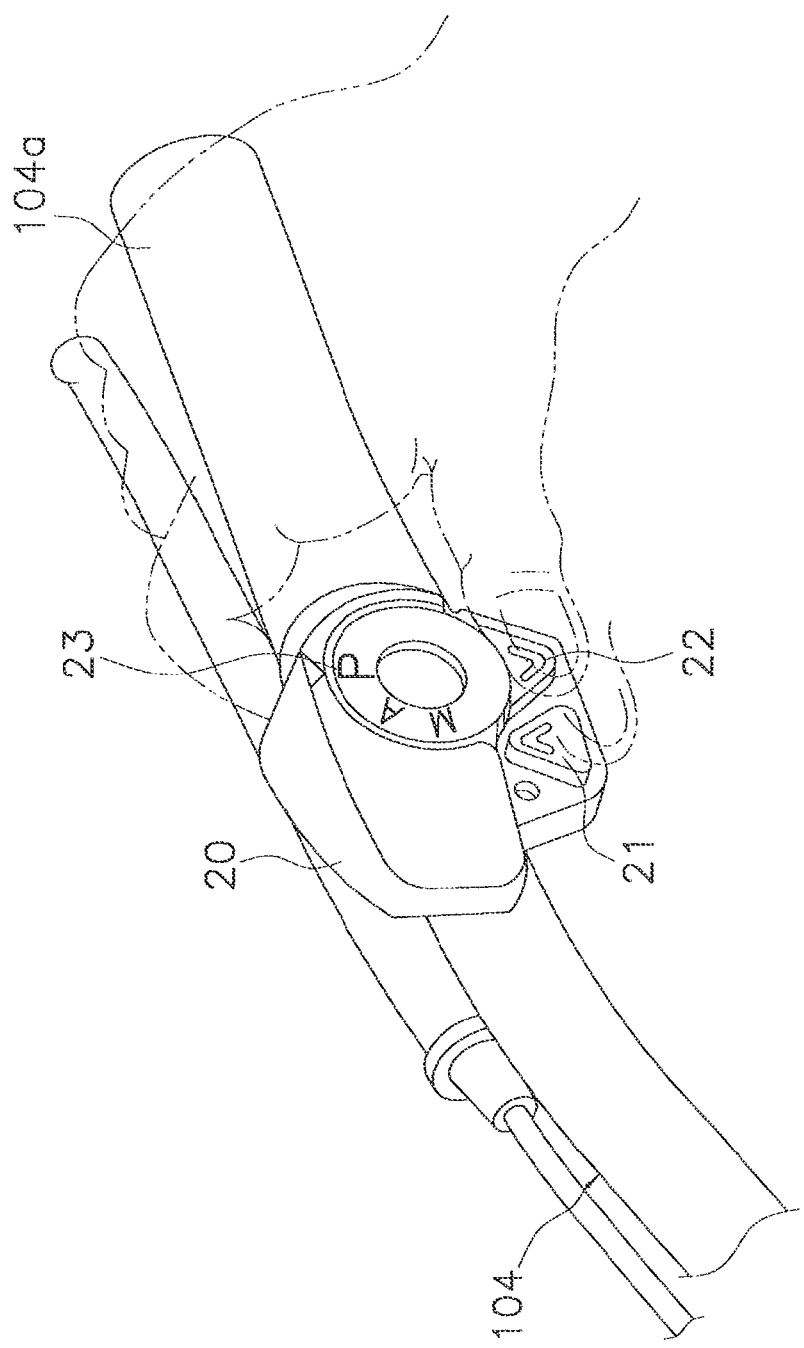
FIG. 3 shows a gear shifter unit attached to a handlebar.

As shown in FIG. 3, a gear shifter unit 20 is attached to the handlebar 104 near a grip 104a. The gear shifter unit 20 is a single unit integrating a first shifter operating button 21, a second shifter operating button 22, and an operating dial 23.

As shown in FIG. 3, the first and second shifter operating buttons 21 and 22 and the operating dial 23 are positioned such that a person can operate them with a finger while gripping the grip 104a of the handlebar 104.

The first and second shifter operating buttons 21 and 22 are pushbuttons. The first shifter operating button 21 is a button for shifting from a lower gear to a higher gear. The second shifter operating button 22 is a button for shifting from a higher gear to a lower gear. The operating dial 23 is a dial for switching between two shifting modes and a parking (P) mode and has three stop positions: P, A and M. The two shifting modes are an automatic shifting mode (A) and a manual shifting mode (M). The automatic shifting mode is a mode in which the internally geared hub 120 is shifted automatically based on a bicycle speed signal from a bicycle speed sensor 41 (explained later). The manual shifting mode is a mode in which the internally geared hub 120 is shifted to any desired gear by operating the first and second shifter operating buttons 21 and 22. The parking mode is a mode in which rotation of the rear wheel 107 is restricted by locking the internally geared hub 120.

Figure 4:
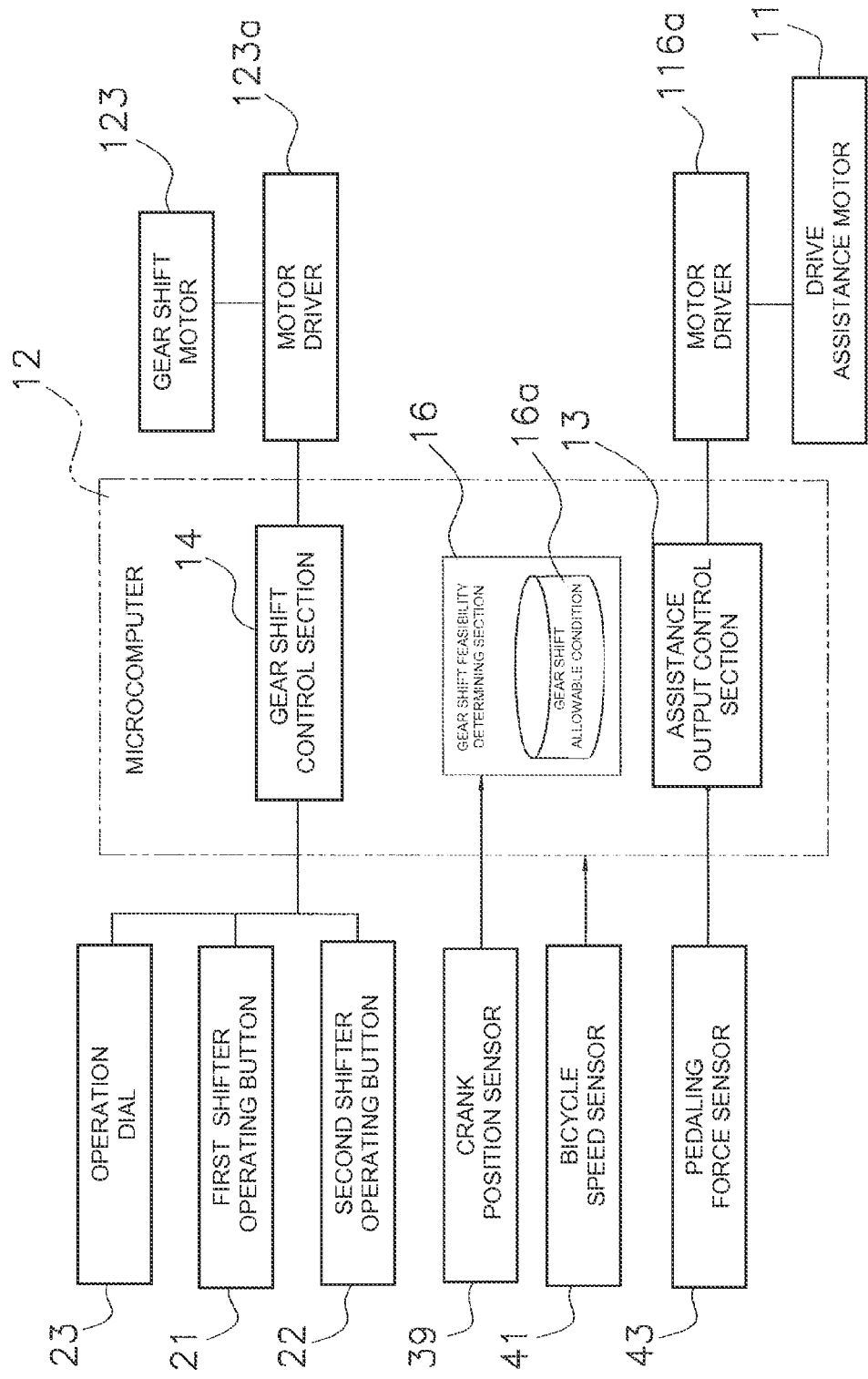
FIG. 4 is a block diagram of a bicycle control apparatus.

The bicycle control apparatus used on the bicycle 101 includes a microcomputer 12 and serves to control electrical components that are connected to the bicycle control section. The microcomputer 12 is provided on the frame 2 and comprises a CPU (central processing unit), a RAM (random access memory), a ROM (read only memory), and an I/O interface, as well as several functional sections. As shown in FIG. 4, the functional sections of the microcomputer 12 include an assistance output control section that controls the output of the drive assistance motor 116, a gear shift control section 14 that controls the gear shift motor 123 to execute a gear shifting operation of the internally geared hub 120, and a gear shift feasibility determining section that determines if conditions are acceptable for driving the gear shift motor 123 and executing a gear shifting operation.

The microcomputer 12 receives information from sensors and commands resulting from operations performed by a person. More specifically, the microcomputer 12 is electrically connected to the first shifter operating button 21, the second shifter operating button 22, the operating dial 23, the crank position sensor 39, the bicycle speed sensor 41, and a pedaling force sensor 43. As explained previously, the first and second shifter operating buttons 21 and 22 and the operating dial 23 are positioned such that a person can operate them while gripping a grip 104a of the handlebar 104. The crank position sensor 39 is installed on the crank arm 112b and the frame 102 as explained previously. The bicycle speed sensor 41 is built into a generator hub 109 (see FIG. 1) provided on a front wheel 106. The generator hub 109 in which the bicycle speed sensor 41 is installed is an alternating current generator, and the bicycle speed sensor 41 sends an alternating current signal to the microcomputer 12 in response to rotation of the front wheel 106. The pedaling force sensor 43 detects a torque of the crank axle 112a in a non-contact manner or by contacting the crank axle 112a or the crank arm 112b. The pedaling force sensor 43 is, for example, a magnetorestrictive sensor having a magnetorestrictive element provided on the crank axle 112a and a detection coil arranged facing opposite the magnetorestrictive element, a strain gauge provided on the crank axle 112a or one of the crank arms 112b, or a strain gauge provided on a supporting section supporting the crank axle 112a. The pedaling force sensor 43 is not limited to these configurations and any sensor whose output varies according to the torque acting on the crank axle 112a is acceptable. The pedaling force sensor 43 sends a signal that changes according to the pedaling force acting on the crank axle 112a to the microcomputer 12 as information indicating a torque value. The first and second shifter operating buttons 21 and 22 and the operating dial 23 convey commands to the microcomputer 12 in response to being operated by a person.

The assistance output control section 13 of the microcomputer 112 controls the drive assistance motor 116 such that the drive assistance motor 116 generates an assistance force equal to the product of the rider's pedaling force and a prescribed value. The assistance output control section 13 controls the drive assistance motor 116 according to a plurality of assist modes. More specifically, the assistance output control section 13 has three assist modes, namely a high assist mode that assists with an assist force up to a maximum of 2 times the pedaling force, a medium assist mode that assists with an assist force up to a maximum of 1.5 times the pedaling force, and a low assist mode that assists with an assist force up to a maximum of 1 times the pedaling force. The assistance output control section 13 also has an off mode in which it does not provide assistance. It is acceptable for the assist modes to be changed using a switch (not shown) provided on the handlebar unit 104 or using the operating dial 23.

The assistance output control section 13 temporarily sets the assistance force to zero when it receives a request from the gear shift control section 14. A more detailed explanation will be provided later.

The gear shift control section 14 of the microcomputer 12 either controls the gear shift motor 123 in accordance with an operation of the first or second shifter operating button 21 or 22 to change the internally geared hub 120 to another gear or controls the gear shift motor 123 automatically in accordance with the bicycle speed and changes the internally geared hub 120 to another gear. As will be explained later with reference to FIG. 6, before changing the gear of the internally geared hub 120, the gear shift control section 14 sends a command to the assistance output control section 13 to temporarily set the assistance force to zero. Also, when the gear shift feasibility determining section 16 deter that it is not possible to change gears, the gear shift control section 14 does not send the operating instruction to the gear shift motor 123 and waits until the determination of the gear shift feasibility determining section 16 changes to indicate that changing gears is possible.

When a person has selected the manual shifting mode by setting the operating dial 23 to the stop position M, the gear shift control section 14 executes a gear shift from a lower gear to a higher gear when the first shifter operating button 21 is operated and executes a gear shift from a higher gear to a lower gear when the second shifter operating button 22 is operated.

When the automatic shifting mode has been selected by setting the operating dial 23 to the stop position A, the gear shift control section 14 determines if changing gears is necessary based on bicycle speed information acquired from the bicycle speed signal received from the bicycle speed sensor 41. If changing gears is necessary, then the gear shift control section 14 sends a gear shift instruction command to the gear shift motor 123 of the internally geared hub 120. The gear shift control section 14 holds two tables for automatic gear changing and selects which table to use based on a pedaling force value (torque of crank axle 112a) detected by the pedaling force sensor 43. More specifically, a table for a high torque mode and a table for a normal mode are stored and both tables store bicycle speed threshold values for upshifting and downshifting in the automatic shifting mode. The bicycle speed threshold values stored for the high torque mode are bicycle speed threshold values for when the pedaling force value is equal to or larger than a prescribed value, and the bicycle speed threshold values stored for the normal mode are bicycle speed threshold values for when the pedaling force value is smaller than a prescribed value.

The gear shift feasibility determining section 16 of the microcomputer 12 determines if is okay for the internally geared hub 120 to execute a gear shifting operation. If the gear shift feasibility determining section 16 has determined that changing the gear of the internally geared hub 120 should not be allowed, i.e., that the gear shift allowable condition is not satisfied, then the gear shift control section 14 will wait without sending an operating instruction to the gear shift motor 123 of the internally geared hub 120 (see step S4 of FIG. 6 explained later).

The gear shift feasibility determining section 16 stores a gear shift allowable condition 16a that is related to the position of the crank arm 112b of the crankset 112, and the position of the crank arm 112b is one output condition of the crankset 112. More specifically, the gear shift allowable condition 16a is the condition that the crank arms 112b of the crankset 112 are positioned near top dead center and bottom dead center. The gear shift feasibility determining section 16 determines that the gear shift allowable condition 16a is satisfied when the crank arms 112b of the crankset 112 are positioned near top dead center and bottom dead center.

The positions of the crank arms 112b of the crankset 112 are detected based on the output of the crank position sensor 39 explained previously. The gear shift feasibility determining section 16 determines if either of the left and right crank arms 112b is in a prescribed region α that includes bottom dead center based on a detection result of the crank position sensor 39. The gear shift feasibility determining section 16 determines if the right crank arm 112b and the left crank arm 112b are in one of four regions based on a combination of outputs from the first Hall element 46a the second Hall element 46b. The first element 46a and the second Hall element 46b are both configured to produce a low (L) level output when they are facing the S pole 45a and a high (H) level output when they are facing the N pole 45b. Combinations of the output signals from the first Hall element 46a and the second Hall element 46b are categorized into a first combination A1, a second combination A2, a third combination A3, and a fourth combination A4.

Figure 5A:
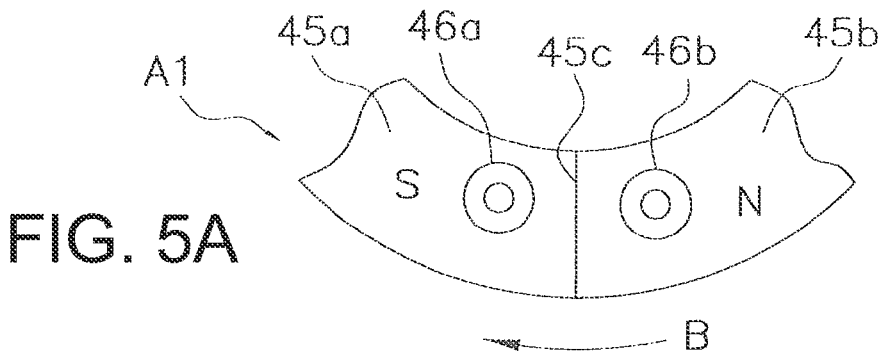
FIGS. 5A to 5D illustrates how a crank arm position is determined.

FIG. 5A shows an example of positions of the first Hall element 46a, the second Hall element 46b, and the magnet 45 when the output signals form the first combination A1. In the first combination A1 the output of the first Hall element 46a is at the low (L) level and the output of the second Hall element 46b is at the high (H) level. The outputs of the first Hall element 46a and the second Hall element 46b form the first combination A1 when the right crankset 112b is in the prescribed region α that includes the bottom dead center position. When the outputs of the first Hall element 46a and the second Hall element 46b form the first combination A1, the first border line 45c of the magnet 45 is positioned between the first Hall element 46a and the second Hall element 46b in a side view of the bicycle 101 as shown in FIG. 5A.

Figure 5B:
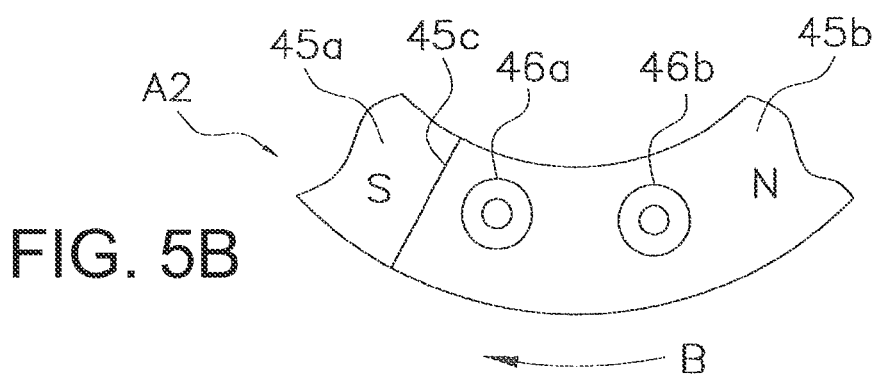

FIG. 5B shows an example of positions of the first Hall element 46a, the second Hall element 46b, and the magnet 45 when the output signals form the second combination A2. In the second combination A2, the outputs of the first Hall element 46a and the second Hall element 46b are both at the H level. The outputs of the first Hall element 46a and the second Hall element 46b form the second combination A2 when the right crank arm 112b has been rotated in the direction of an arrow B (clockwise when viewed from the right side of the bicycle 101) from the prescribed region α including the bottom dead center position to such an extent that the first border line 45c of the magnet 45 has passed the first Hall element 46a but the left crank arm 112b has not yet entered the prescribed region α including the bottom dead center position.

Figure 5C:
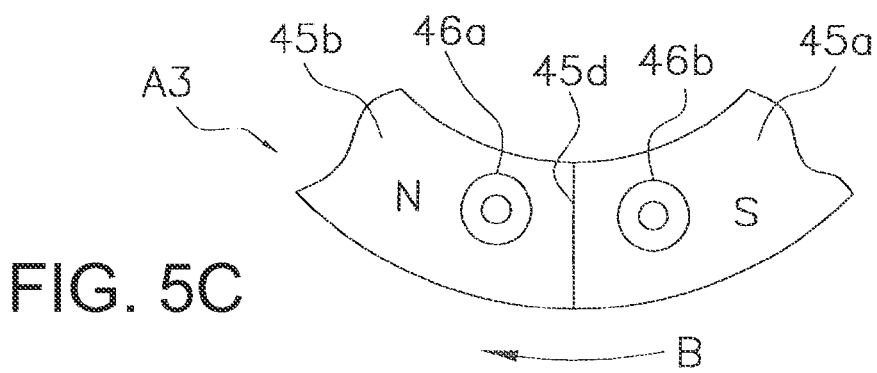

FIG. 5C shows an example of positions of the first Hall element 46a, the second Hall element 46b, and the magnet 45 when the output signals form the third combination A3. In the third combination A3, the output of the first element 46a is at the H level and the output of the second Hall element 46b is at the L level. The outputs of the first Hall element 46a and the second Hall element 46b form the third combination A3 when the left crankset 112b is in the prescribed region α that includes the bottom dead center position. When the outputs of the first Hall element 46a and the second Hall element 46b form the third combination A3, the second border line 45d of the magnet 45 is positioned between the first Hall element 46a and the second Hall element 46b in a side view of the bicycle 101 as shown in FIG. 5C.

Figure 5D:
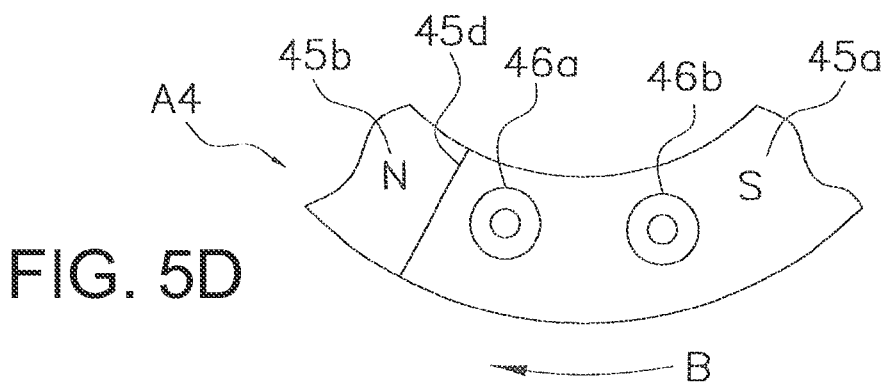

FIG. 5D shows an example of positions of the first Hall element 46a, the second Hall element 46b, and the magnet 45 when the output signals form the fourth combination A4. In the fourth combination A4, the outputs of the first Hall element 46a and the second Hall element 46b are both at the L level.

The outputs of the first Hall element 46a and the second Hail element 46b form the fourth combination A4 when the left crank arm 112b has been rotated in the direction of an arrow B (clockwise when viewed from the right side of the bicycle 101) from the prescribed region α including the bottom dead center position to such an extent that the second border line 45d of the magnet 45 has passed the first Hall element 46a but the right crank arm 112b has not yet entered the prescribed region α including the bottom dead center position.

The gear shift feasibility determining section 16 determines that the gear shift allowable condition 16a, i.e., the condition that the crank arms 112b be positioned near top and bottom dead center, is satisfied when the first combination A1 is formed because the right crank arm 112b is positioned near bottom dead center (left crank arm 112b is positioned near top dead center) and when the third combination A3 is formed because the left crank arm 112b is positioned near bottom dead center (right crank arm 112b is positioned near top dead center).

Figure 6:
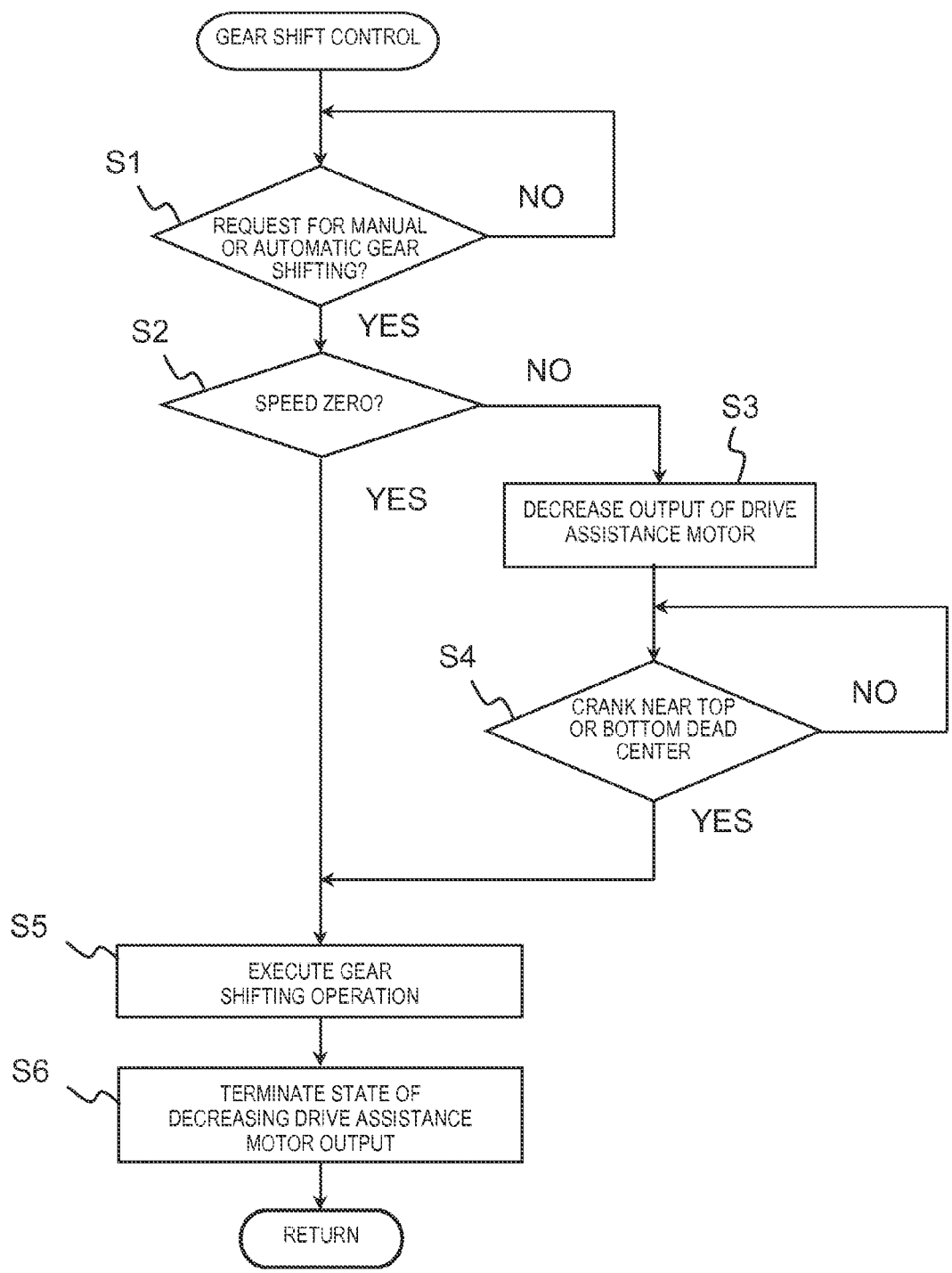
FIG. 6 is a flowchart of a shift control.

The main features of the gear shift control executed by the gear shift control section 14 will now be explained with reference to FIG. 6. The gear shift control proceeds according to the flowchart shown in FIG. 6 regardless of whether the apparatus is in the manual shifting mode or the automatic shifting mode.

When there is a request to change the gear of the internally geared hub 120, the gear shift control section 14 proceeds from step S1 to step S2. In step S2, the gear shift control section 14 determines if the calculated bicycle speed is zero based on the signal from the bicycle speed sensor 41. If the bicycle speed is zero, then the gear shift control section 14 proceeds from step S2 to step S5 and immediately sends an operating instruction to the gear shift motor 123 to execute a gear shifting operation. When the bicycle speed is zero, there is substantially no torque acting on the internal parts of the internally geared hub 120 and, thus, the gear shifting operation is accomplished smoothly. If it determines in step S2 that the bicycle speed is not zero, then the gear shift control section 14 proceeds to step S3. In step S3, the gear shift control section 14 lowers the assistance force produced by the drive assistance motor 116 regardless of which assist mode the apparatus is in. In this embodiment, in step S3, the assistance output control section 13 temporarily sets the output of the drive assistance motor 116 to zero such that no riding assistance is delivered. In step S4, the gear shift feasibility determining section 16 determines if the gear shift allowable condition 16a is satisfied, i.e., of the crank arms 112b of the crankset 112 are positioned near top and bottom dead center. If the crank arms 112b are not positioned near the top and bottom dead center position, then step S4 is repeated until the crank arms 112b are near the top and bottom dead center positions. If the crank arms 112b are positioned near the top and bottom dead centers or when the crank arms 112b come to be positioned near the top and bottom dead centers), then the gear shift control section 14 proceeds to step S5 and executes the gear shifting operation. Since the riding assistance has been stopped and the crank arms 112b are positioned at top dead center and bottom dead center, the torque acting on the internal parts of the internally geared hub 120 is very small and the gear shifting operation is conducted smoothly. When the gear shifting operation of step S5 is completed, the gear shift control section 14 proceeds to step S6. In step S6, if the output of the drive assistance motor 116 was towered in step S3, i.e., set to zero in this embodiment, then the gear shift control section 14 cancels the lowered output state and returns to controlling the output based on the assist mode that was already set. Additionally, it is acceptable to configure step S6 such that the lowered output state of the drive assistance motor 116 is cancelled when a prescribed amount of time has elapsed since the gear shifting operation was executed in step S5. It is also acceptable to provide a sensor in the transmission or the gear shift motor to detect the current gear and configure step S6 such that the lowered output state of the drive assistance motor 116 is cancelled when it is determined that the gear shifting operation has been completed based on the output of the sensor.

Although an embodiment of a bicycle drive apparatus according to the present invention has been presented heretofore, the present invention is not limited to the embodiment and various modifications can be made without departing from the scope of the invention as defined by the claims.

It is acceptable for an indicator/input device having a touch panel to be fastened to the handlebar unit 104 and such that it can be used for such things as selecting the assist mode, indicating the bicycle speed and gear position, and displaying the remaining capacity of the rechargeable battery 117.

In the previously explained embodiment, in step S3, the assistance output control section 13 temporarily sets the output of the drive assistance motor 116 to zero such that no riding assistance is delivered during the gear shifting operation. Instead, it is acceptable to configure steps S3 such that the assistance force output of the drive assistance motor 116 is temporarily reduced during the gear shifting operation by decreasing the output attic drive assistance motor 116 to be smaller than an output value based on the assist mode in effect at that time (e.g., decrease the output to half the output value). Even if some degree of riding assistance is allowed to continue, the gear shifting operation will be smoother if the output is decreased.

In the previously explained embodiment, the gear shift allowable condition 16a stored in the gear shift feasibility determining section 16 is a condition that is related to the positions of the crank arms 112b of the crankset 112, which is one output condition of the crankset 112. Instead, it is acceptable to use a gear shift allowable condition that is related to the torque of the crank axle 112a of the crankset 112, which is another output condition attic crankset 112. More specifically, it is acceptable to determine that the gear shift allowable condition is satisfied when the torque attic crank axle 112a detected by the pedaling force sensor 43 is within a prescribed range (i.e., smaller than a prescribed value). In this way, too, the gear shifting operation can be executed smoothly because the riding assistance is reduced or eliminated and the pedaling force acting on the crank 12 is small such that the torque acting on the internal parts of the internally geared hub 120 is small.

In the previously explained embodiment, the gear shift allowable condition 16a stored in the gear shift feasibility determining section 16 is a condition that is related to the positions of the crank arms 112b of the crankset 112, which is one output condition of the crankset 112. Instead, it is acceptable to use a gear shift allowable condition that is related to a torque of the rear wheel 107, which is another output condition of the crankset 112. More specifically, a sensor could be provided to detect the torque of the rear wheel 107. Then, the gear shift allowable condition could be determined to be satisfied when the torque detected by the sensor is smaller than a prescribed threshold value. In this way, too, the gear shifting operation can be executed smoothly because the gear shifting operation is executed when the riding assistance is reduced or eliminated and the torque of the rear wheel 107 on which the internally geared hub 120 is installed is small such that the torque acting on the internal parts of the internally geared hub 120 is small. It is also acceptable to calculate the torque of the rear wheel 107 based on the crank axle torque and a gear ratio.

In the previously explained embodiment, the gear shift allowable condition 16a stored in the gear shift feasibility determining section 16 is a condition that is related to the positions of the crank arms 112b of the crankset 112, which is one output condition of the crankset 112. Instead, it is acceptable to use a gear shift allowable condition that is related to a transmission torque of the internally geared hub 120, which is another output condition of the crankset 112. More specifically, the torque transmitted from the chain to the internally geared hub 120 through the sprocket is detected directly or calculated. Then, the gear shift allowable condition could be determined to be satisfied when that torque is smaller than a prescribed threshold value. Since an input torque at which changing gears is possible is already set in advance with respect to the internally geared hub 120, it is acceptable to use this preset input torque as the threshold value. In this way, too, the gear shifting operation can be executed smoothly because the gear shifting operation is executed when the riding assistance is reduced or eliminated and the torque of the internally geared hub 120 is small such that the torque acting on the internal parts of the internally geared hub 120 is small.

In the previously explained embodiment, the present invention is employed in a bicycle 101 in which an internally geared hub 120 constituting an internal transmission is installed on the rear wheel 107. Instead, it is acceptable for the present invention to be employed in a bicycle having a transmission that is installed on the crank axle and configured to change gears using a planetary gear mechanism.

In the previously explained embodiment, the present invention is employed in a bicycle 101 in which an internally geared hub 120 constituting an internal transmission is installed on the rear wheel 107. Instead, it is acceptable for the invention to be employed in a bicycle equipped with an external transmission having a front derailleur or a rear derailleur that are electrically driven. In such a case, execution of gear shifting operations can be avoided when an excessive force acts on the external transmission and gear shifting operations can be executed smoothly. In the case of an external transmission, in step S2 of FIG. 6 the gear shift control section 14 determines if the calculated bicycle speed is zero based on the signal from the bicycle speed sensor 41. The gear shift control section 14 proceeds to step S3 if the bicycle speed is not zero and waits until the bicycle speed is larger than zero in step S2 before it proceeds to step S3 and subsequent steps. In other words, if the bicycle speed is determined to be zero in step S2, then the gear shift control section 14 repeats step S2 until the bicycle speed is zero or larger. Then, the gear shift control section 14 proceeds to step S3 and subsequent steps (steps S3 to S6).

In the previously explained embodiment, an assist mechanism 115 is arranged near the crank axle 112a and the torque of the drive assistance motor 116 is transmitted to the chain 110 through a power assistance sprocket. Instead of the assist mechanism 115, it is acceptable to install a motor unit for riding assistance on the front wheel 106. A drive assistance motor, an inverter, and a bicycle speed sensor are preferably arranged inside the motor unit.

In the previously explained embodiment, an assist mechanism 115 is arranged near the crank axle 112a and the torque of the drive assistance motor 116 is transmitted to the chain 110 through a power assistance sprocket. Instead of the assist mechanism 115, it is acceptable to install a motor unit for riding assistance on the rear wheel 107. In such a case, the motor unit is provided on an output side of the transmission.

The crank position detecting sensor 39 is not limited to the previously explained configuration and it is acceptable to use a rotary encoder as the crank position detecting sensor 39.

In the previously explained embodiment, the assistance output control section 13 controls the drive assistance motor 116 based on the output of the pedaling force sensor 43, which detects the torque acting on the crank axle. Instead of the pedaling force sensor 43, it is acceptable to provide a sensor that detects a depression force of a pedal or a sensor that detects the tension of the chain. The assistance output control section 13 could then control the drive assistance motor 116 based on the information from such a sensor.

Although in the previously explained embodiment step S2 is configured to determine if the bicycle speed is zero, it is acceptable to configure step S2 to determine if the crank is rotating or not. For example, a crank position sensor can be used as a sensor to detect rotation of the crank. When the crank position detected by the crank position sensor does not change, the gear shift control section determines that the crank is not rotating. If it determines in step S2 that a signal from the crank position sensor changes within a prescribed amount of time, then the gear shift control section determined that the crank is rotating and proceeds to step S3. If it determines in step S2 that the signal from the crank position sensor does not change within the prescribed amount of time, then the gear shift control section determined that the crank is not rotating and proceeds to step S5. The sensor for detecting the rotation of the crank is not limited to the previously explained configuration; it is acceptable for the sensor to be realized with a magnet and a reed switch. In the case of an external transmission, the gear shift control section determines that the crank is rotating in step S2 of FIG. 6 and proceeds to step S3 if the signal from the crank position sensor changes within a prescribed amount of time. If it determines in step S2 that the crank is not rotating, then the gear shift control section waits until it determines that the crank is rotating before it proceed to step S3 and subsequent steps.

Although in the previously explained embodiment step S2 is configured to determine if the bicycle speed is zero, it is acceptable to configure step S2 to determine if a pedaling force is detected by a pedaling force sensor. If it determines in step S2 that a pedaling three exists based on a signal from the pedaling force sensor, then the gear shift control section proceeds to step S3. If not, then the gear shift control section proceeds to step S5. In the case of an external transmission, it determines in step S2 of FIG. 6 that a pedaling force exists based on a signal from the pedaling force sensor, then the gear shift control section proceeds to step S3. If not, then the gear shift control section waits until a pedaling force is detected before it proceeds to step S3 and subsequent steps.

In the previously explained embodiment, it is acceptable to omit step S2 and configure the control such that the gear shift control section proceeds to step S3 when a gear shift request is determined to have occurred in step S1.

Moreover, components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle drive apparatus comprising:
    a bicycle crankset;
    a bicycle transmission;
    a drive assistance electric motor; and
    a microcomputer including
        an output control section that controls an output of the drive assistance electric motor,
        a gear shift feasibility determining section that determines if an output condition of the bicycle crankset satisfies a gear shift allowable condition, and
        a gear shift control section that receives a gear shift request, instructs the output control section to at least one of stop the output of the drive assistance electric motor and decrease the output of the drive assistance electric motor, and instructs the transmission to execute a gear shifting operation upon the gear shift permission determining section determining that the gear shift allowable condition is satisfied.

2. The bicycle drive apparatus as recited in claim 1, wherein
    the gear shift feasibility determining section determines the output condition of the bicycle crankset based on a detected position of the bicycle crankset.

3. The bicycle drive apparatus as recited in claim 1, wherein
    the gear shift feasibility determining section determines the output condition of the bicycle crankset based on a detected transmission torque of the transmission.

4. The bicycle drive apparatus as recited in claim 1, wherein
    the gear shift feasibility determining section determines the output condition of the bicycle crankset based on a detected rear wheel torque.

5. The bicycle drive apparatus as recited in claim 1, wherein
    the gear shift feasibility determining section determines the output condition of the bicycle crankset based on a detected torque of a crank axle of the bicycle crankset.

6. The bicycle drive apparatus as recited in claim 2, further comprising
    a crank position sensor that detects a position of the bicycle crankset; and the gear shift feasibility determining section determining that the gear shift allowable condition is satisfied while a crank arm of the bicycle crankset is positioned within twenty degrees of at least one of a top dead center position and a bottom dead center position of the bicycle crankset.

7. The bicycle drive apparatus as recited in claim 5, further comprising
    a crank axle torque measuring section that measures a torque of the crank axle; and the gear shift feasibility determining section determining that the gear shift allowable condition is satisfied while the torque of the crank axle is within a prescribed range.

8. The bicycle drive apparatus as recited in claim 1, wherein
    the transmission includes a gear shift motor; and the gear shift control section issuing a shift command to drive the gear shift motor to shift the transmission.

9. The bicycle drive apparatus as recited in claim 1, wherein
    the drive assistance electric motor is configured to drive a bicycle chain.

10. The bicycle drive apparatus as recited in claim 1, wherein
    the transmission is an internal transmission.

11. The bicycle drive apparatus as recited in claim 1, wherein
    the transmission is an external transmission.

* * * * *